United States Patent Office 3,439,200
Patented Apr. 15, 1969

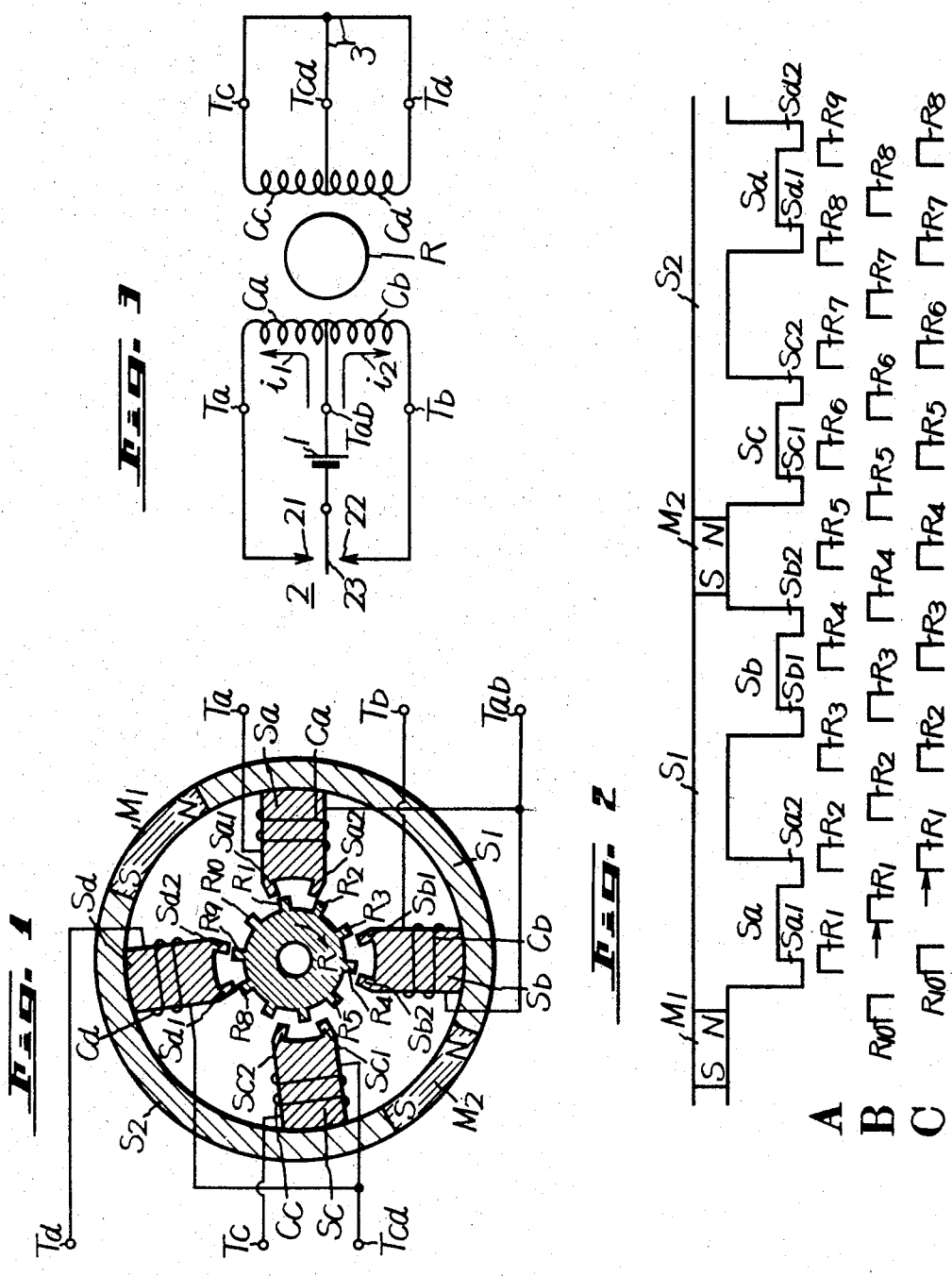

3,439,200
REVERSIBLE STEPPING MOTOR WITH BRAKING COILS AND BIASING PERMANENT MAGNETS
Bunjiro Saito and Tateo Suga, Tokyo, Japan, assignors to Kabushikikaisha Yokagawa Denki Seisakusho Yokogawa Electric Works, Ltd., Tokyo, Japan, a corporation of Japan
Filed Dec. 13, 1966, Ser. No. 601,456
Claims priority, application Japan, Jan. 18, 1966, 41/2,736
Int. Cl. H02k 37/00
U.S. Cl. 310—49      2 Claims This invention relates to a step motor which is driven by an impulse whose polarity is alternately reversed and in which the rotor is rotated a certain angle step by step.

One object of this invention is to provide a step motor which is simple in construction but reliable in operation.

Another object of this invention is to provide a step motor in which the sense of rotation of the rotor core can easily be reversed.

Still another object of this invention is to provide a step motor in which exciting coils are short-circuited so as to ensure braking of the rotor core.

Othe objects, features and advantages of this invention will become apparent from the following description taken in conjunction with the accompanying drawings, in which:

FIGURE 1 is a cross-sectional view schematically illustrating one example of a step motor of this invention;

FIGURE 2 is an explanatory diagram of the step motor shown in FIGURE 1; and

FIGURE 3 is a connection diagram for explaining the connection of exciting coils employed in the step motor of this invention.

In FIGURE 1 reference characters $S_a$, $S_b$, $S_c$ and $S_d$ indicate stator cores which are disposed centripetally. In the illustrated example the stator cores $S_a$, $S_b$ and $S_c$, $S_d$ are respectively spaced apart an angular distance of approximately 90°, the stator cores $S_a$ and $S_d$ being spaced apart an angular distance of about 97° and the stator cores $S_b$ and $S_c$ being spaced apart an angular distance of about 83°. Each stator core is provided with two poles at its top as illustrated in the figure. The stator cores $S_a$ and $S_b$ are connected to each other through a yoke $S_1$, while the remaining stator cores $S_c$ and $S_d$ are also connected to each other through a yoke $S_2$. Reference characters $M_1$ and $M_2$ identify permanent magnets which are interposed between the yokes $S_1$ and $S_2$ as illustrated. Reference character R designates a columnar rotor core and $R_1$ to $R_{10}$ poles provided on the rotor core R at equiangular intervals, and the distance of the two poles of each stator core is selected to be substantially equal to the angular distance between the adjacent poles of the rotor core R. Reference characters $C_a$, $C_b$, $C_c$ and $C_d$ indicate exciting coils wound several turns on the stator cores $S_a$, $S_b$, $S_c$ and $S_d$ in the same direction, the starting ends of the exciting coils being connected respectively to terminals $T_a$, $T_b$, $T_c$ and $T_d$. The terminating ends of the exciting coils $C_a$ and $C_b$ are connected to each other to form a series circuit and their connecting point is connected to a terminal $T_{ab}$, while the terminating ends of the exciting coils $C_c$ and $C_d$ are connected to each other to constitute a series circuit and their connecting point is connected to a terminal $T_{cd}$. The terminal $T_{ab}$ is connected to a DC power source 1 and to the terminals $T_a$ and $T_d$ through a change-over switch 2, as illustrated in FIGURE 3 and the terminals $T_c$, $T_d$ and $T_{cd}$ are short-circuited through a lead wire 3. In this case, the relationship between the polarity of the permanent magnets $M_1$ and $M_2$ and that of the DC power source 1 is selected such that a magnetic flux induced in the stator cores $S_a$ and $S_b$ by a current flowing through the coils $C_a$ and $C_b$ may be in such a direction as to cancel a magnetic flux induced in these stator cores by the permanent magnets $M_1$ and $M_2$.

A description will be given in connection with the operation of the step motor constructed as above described. Suppose that a movable contact piece 23 of the change-over switch is held out of contact with the stationary contacts 21 and 22 and that the rotor core R stands still with its poles $R_1$ to $R_{10}$ being stationed at such positions as shown in, for example, FIGURE 2A, relative to the poles $S_{a1}$, $S_{a2}$ ... $S_{d1}$ and $S_{d2}$ of the stator cores $S_a$, $S_b$, $S_c$ and $S_d$. In this case, the rotor core R assumes such a position that the forces of the poles $S_{a1}$ and $S_{a2}$ of the stator core $S_a$ and those $S_{d1}$ and $S_{d2}$ of the stator core $S_d$ respectively attracting the poles $R_1$, $R_2$ and $R_8$, $R_9$ of the rotor R due to the magnetic force of the permanent magnets $M_1$ and $M_2$ are in equilibrium and that, though weaker than the aforementioned forces, the forces of the poles $S_{b1}$ and $S_{b2}$ of the stator core $S_b$ and those $S_{c1}$ and $S_{c2}$ of the stator core $S_c$ respectively attracting the poles $R_3$, $R_4$ and $R_6$, $R_7$ of the rotor R due to the magnetic force of the permanent magnets $M_1$ and $M_2$ are in equilibrium.

Putting the movable contact piece 23 of the change-over switch into contact with an upper stationary contact 21 when the rotor core R stays at such a position, an output current $i_1$ of the power source 1 flows through the coil $C_a$ and a magnetic flux produced in the stator core $S_a$ by the current cancels the magnetic flux produced in the stator core $S_a$ by the permanent magnets $M_1$ and $M_2$, eliminating almost all the attractive force of the poles $S_{a1}$ and $S_{a2}$ of the stator core $S_a$. As a result of this, the rotor poles $R_2$ and $R_4$ are attracted to the poles $S_{b1}$ and $S_{b2}$ of the stator core $S_b$, while the rotor poles $R_8$ and $R_9$ are attracted to the poles $S_{d1}$ and $S_{d2}$ of the stator core $S_d$, causing the rotor core R to rotate in a direction indicated by the arrow and to stand still at such a position as illustrated in FIGURE 2B where the attractive forces are in equilibrium. Thus, the rotor core R is rotated one step in the clockwise direction.

Turning the contact piece 23 of the change-over switch down to the lower stationary contact 22, an output current $i_2$ emanating from the power source flows through the coil $C_c$. A magnetic flux produced in the stator core $S_b$ by the permanent magnets $M_1$ and $M_2$. Accordingly, the rotor poles $R_{10}$ and $R_1$ are attracted to the poles $S_{a1}$ and $S_{a2}$ of the stator core $S_a$ and the rotor poles $R_5$ and $R_6$ are attracted to the poles $S_{c1}$ and $S_{c2}$ of the stator core $S_c$, so that the rotor core R is rotated in a direction indicated by the arrow and stands still at such a position as shown in FIGURE 2C where the attractive forces are in equilibrium. In this manner, the rotor core R is rotated another step in the clockwise direction.

In a conventional step motor, when the rotor core R is about to stop after having rotated one step, the rotor core swings about such positions as shown in, for example, FIGURES 2B and 2C, causing hunting of the step motor to deteriorate its frequency response characteristic. In the step motor described above, however, the coils $C_c$ and $C_d$ of the stator cores $S_c$ and $S_d$ through which magnetic flux passes from the permanent magnets $M_1$ and $M_2$ are short-circuited, so that these coils serve to prevent the swinging of the rotor core. This enables the production of a step motor having excellent frequency response characteristic without providing a special braking mechanism on the shaft of the rotor core or a special short-circuit mechanism on the rotor poles. In order to rotate the rotor core in the opposite direction, the lead wires are connected in such a manner that the coils $C_c$ and $C_d$ are alternately excited and that the coils $C_a$ and $C_b$ are short-circuited.

The present invention has been described in connection with the step motor having four stator cores but the principles of this invention may be applied to a step motor having stator cores of a number which is a multiple of 4, and reference to the four stator cores should not be construed as limiting the invention specifically thereto.

In accordance with this invention the direction of rotation of the rotor core can easily be changed in spite of the asymmetrical arrangement of the stator cores. Further, since the exciting coils used for reversal of the rotor core are short-circuited to enhance the braking characteristic, a step motor of excellent frequency response characteristic can be produced with a simple construction. In addition, the stator cores are adapted to be excited by the permanent magnets even when the exciting coils are held non-excited, and accordingly there is no necessity of providing special exciting means for holding the rotor core at its standstill position.

It will be apparent that many modifications and variations may be effected without departing from the scope of the novel concepts of this invention.

What we claim is:

1. A step motor comprising a rotor core having a plurality of poles spaced apart at substantially equiangular intervals, stator cores of an integral multiple of 4 having poles spaced apart an angular distance substantially equal to the distance between the adjacent poles of the rotor core, permanent magnets energizing the stator cores, two groups of exciting coils would on the stator cores for normal and reverse rotation of the step motor, each group including two pairs of exciting coils, and means for exciting the two pairs of exciting coils of one group alternately, a magnetic flux produced by the permanent magnets in the stator cores being reduced by the excitation of the exciting coils to rotate the rotor core, and the two pairs of exciting coils of the other group being short-circuited for braking of the rotor core, whereby the rotor is driven step by step according to the operation of the means.

2. A step motor comprising a rotor core having a plurality of poles spaced apart at substantially equiangular intervals, two pairs of stator cores each having two poles spaced apart an angular distance substantially equal to that between the adjacent poles of the rotor cores, the stator cores of each pair being spaced apart an angular distance of 90°, each pair of the stator cores being spaced apart from the other at angular distances of a little greater and less than 90°, yokes for magnetically coupling the stator cores, permanent magnets inserted between the yokes fo rexciting the stator cores, exciting coils each wound on each of the stator cores, a power source for exciting the coils wound on two adjacent stator cores, a switch for changing over the power source to the exciting coils, means for short-circuiting the exciting coils wound on the other two adjacent stator cores.

References Cited
UNITED STATES PATENTS

| | | | |
|---|---|---|---|
| 2,982,872 | 5/1961 | Fredrickson | 310—163 |
| 3,174,088 | 3/1965 | Muller | 318—138 |
| 3,200,315 | 8/1965 | Thompson | 318—138 |
| 3,293,459 | 12/1966 | Kreuter et al. | 310—49 |

WARREN E. RAY, *Primary Examiner.*

U.S. Cl. X.R.

318—138; 310—181